J. MACKIE AND J. J. COTTRELL.
SPRING OILING DEVICE.
APPLICATION FILED SEPT. 29, 1919.
1,335,516.
Patented Mar. 30, 1920.
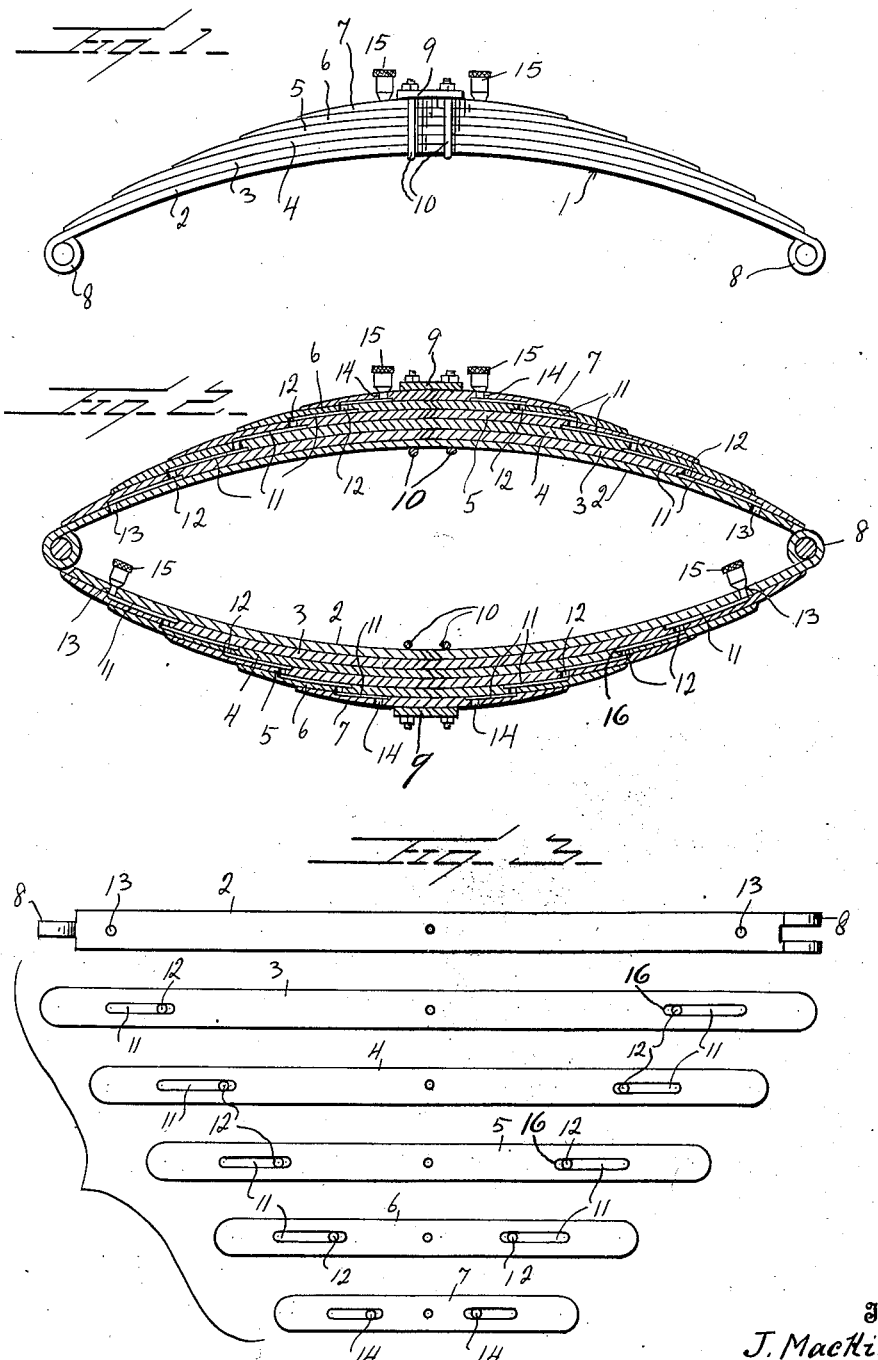

UNITED STATES PATENT OFFICE.

JOHN MACKIE AND JOHN J. COTTRELL, OF GRAND JUNCTION, COLORADO.

SPRING-OILING DEVICE.

1,335,516.    Specification of Letters Patent.    Patented Mar. 30, 1920.

Application filed September 29, 1919. Serial No. 327,025.

*To all whom it may concern:*

Be it known that we, JOHN MACKIE and JOHN J. COTTRELL, citizens of the United States, residing at Grand Junction, in the county of Mesa and State of Colorado, have invented certain new and useful Improvements in Spring-Oiling Devices, of which the following is a specification, reference being had to the accompanying drawings.

This invention relates to an improved spring oiling device, and an object of the invention is to provide a device of this kind which is very simple and practical, and it has been found that it can be manufactured for a relatively low cost and sold at a reasonable profit.

Heretofore, spring oiling devices of this kind have been produced, some utilizing slots in the leaves of the springs, and others grooves formed in the leaves. This latter type of spring oiling device include branch grooves or channels, therefore in both types the leaves of the spring are considerably weakened. Also, in the latter type of spring oiling device, the bottom leaf of the spring is grooved longitudinally, which considerably weakens the lower leaf of the spring, so much so that the lower leaf of the spring will not withstand the strain, to which it is ordinarly subjected.

Furthermore, in both types of spring oiling devices heretofore mentioned, no means is afforded, whereby the oil or lubricant may escape, that is to say any sediment that may collect in the channel formed by the grooves or slots, therefore the channel formed by such grooves or slots will become clogged. In this case, the spring could not be properly lubricated, after it has been in use for any length of time. Furthermore owing to there being an absence of an outlet for the sediment that may collect in the channel in the types of the spring oiling devices heretofore mentioned, there is no way whereby the channel may be washed out or cleansed by the use of kerosene or some other suitable material for cutting or eating away the corrosive matter or sediment that may collect in the channel. Furthermore, in the devices heretofore employed, the springs are not invertible, at the same time affording means to permit of the escape of sediment, when it is desired to wash out the channels.

As a general object of the invention, it is the aim to provide a very simple construction of spring oiling device, which though it might resemble the heretofore mentioned devices, is by far more practical and efficient, in view of the fact that it obviates the above mentioned disadvantages. Furthermore, while there is a similarity of the present form of spring oiling devices and those heretofore mentioned in a generic sense, and slightly in detail, it should be borne in mind that there is no claim being made broadly to the general idea of constructing the self-oiling spring, involving the use of a channel formed intermediate the leaves of the spring. However, the invention does aim primarily to discard the foregoing disadvantages, and furthermore, make specific claims to the novel and specific features of construction, whereby the spring is not only invertible, so as to be used above or below, and also to maintain the requisite strength and rigidity necessary in springs of this character, but also affording a lubricating means for the spring, involving channels open at their opposite ends, and extending through the upper leaf to and through the lower leaf, thereby making it possible to inject a suitable cleansing fluid through the channel.

Furthermore, by the present form of construction of spring oiling device involving the open ended channels, it is possible to invert the spring, namely to use the spring as either bowing downward or bowing upwardly as the case may be.

The invention further aims to dispense with the branching channels or grooves, thereby avoiding weakening the spring and in lieu thereof employ single narrow grooves or channels formed longitudinally of the leaves of the spring, so that as the spring is built up by the super-imposed leaves, the narrow channels or grooves in the several leaves will overlap, there being communicative connections therebetween so that continuous open ended channels from the upper leaf to the lower leaf are constructed. By the provision of the very narrow single channels in each leaf, the leaf is considerably less weakened than by the use of slots or by the use of branching channels or grooves.

Furthermore, in the present device, the longest leaf is not grooved, therefore it will withstand the necessary strain to which it necessarily must be subjected.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in elevation of a spring, showing the several leaves thereof constructed in accordance with the invention, whereby a spring oiling device for the spring is afforded.

Fig. 2 is a longitudinal sectional view of an elliptical spring, more clearly showing the lubricant receiving channel, whereby the several leaves of the spring are lubricated. In this figure, the upper and lower halves are alike in construction, but to form the lower half a section of spring to be used as an upper part is simply inverted to form the lower part.

Fig. 3 discloses collective views of the several leaves of the spring.

Referring more especially to the drawings, 1 designates a spring which is applicable to any form of vehicle, and which is built up from a plurality of leaf springs 2, 3, 4, 5, 6 and 7, superimposed and being of different graduating lengths. The lower leaf 2 of the spring terminates at its ends in suitable leaves or rolls 8, to receive connecting pins, whereby the spring may be connected to an opposite spring member. The several leaves of the spring are held together by means of a plate 9 and members 10.

The under faces of the leaves 3 to 7 inclusive are provided with narrow channels or grooves 11, and these grooves or channels are so formed in the leaves, that when the leaves are placed together and clamped as disclosed, the channels or grooves assume positions in stepped relation. In other words, the channels or grooves overlie each other at their adjacent ends. Where the grooves or channels overlie or are in stepped relation, the leaves are provided with openings 12, thereby communicatively connecting the several channels or grooves of the leaves, thereby forming continuous channels extending from and through the upper leaf down through the several leaves on each side of the central securing means and terminating adjacent the upper face of the lower leaf. The lower leaf, where the channels upon the opposite sides of the securing means terminate, is provided with openings 13, thereby affording outlets to the opposite channels. The upper leaf 7 of the spring is provided with openings or apertures 14 which constitute inlets for the channels. The lubricant may be allowed to enter the channels on the opposite sides of the securing means by being passed through the openings of the upper leaf. It has been found that when springs heretofore used become dry and corroded, they lose their resiliency and are easily broken by shock. However, when springs are properly oiled or lubricated, they take up the shock without breaking. The lubrication may readily pass through the channels and in passing through them will ooze between and lubricate the various faces of the contacting leaves, thereby allowing the spring to easily take up the shock without breaking and, furthermore, will eliminate the squeaking noise which is usually present in springs which do not afford oiling or lubricating means.

It will be noted that any sediment or corrosion that may collect in the oppositely extending channels may be readily cut out by injecting suitable corrosive cutting substance into the upper parts of the channels, and as this substance or liquid passes through the channels it will cut or eat away the sediment or corrosion, after which it is possible that lubricant will readily flow through the channels and lubricate the several leaves.

Suitable oil cups 15 containing lubricant are threaded into the apertures or openings of the upper leaf, so as to supply lubricant to the lateral channels. It will be noted that it is possible to invert the spring, and in this case the lubricant or oil cups are connected to the longer leaf of the spring. Furthermore, it will be noted that the openings of communication between the several channels or grooves of the leaves are not located directly at the ends of the grooves, but offset a short distance therefrom, whereby it is possible that certain of the lubricant may be collected in the ends of the channels or grooves of the several leaves, so as to pass between the leaves. This is particularly evident, when the spring is inverted, as shown at 16 in Figs. 2 and 3.

It will be noted that in Fig. 1 a bowed spring consisting of several leaves is disclosed, and in Fig. 2, an elliptical spring is illustrated and in this latter figure each of the bowed parts of the elliptical spring is constructed of several leaves. It is obvious that the construction of spring in Fig. 1 is particularly adapted for use in connection with automobiles or other motor driven vehicles, since in this class of vehicle elliptical springs such as shown in Fig. 2 are not employed, but instead a form of spring such as shown in Fig. 1 is used, and is connected at one end to the end of the chassis or frame, while its other end is linked to the frame, the axle of the vehicle adapted to be connected to the spring, so that the spring will yield incident to the movement of the vibration of the axle. The type of spring shown in Fig. 2 is especially adapted for use in connection with the general construction of any make of vehicles, whether drawn or motor propelled. This form of lubricating spring may also be used on locomotives or railway cars.

The invention having been set forth, what is claimed as new and useful is:

1. A spring comprising a series of superimposed leaves, the leaves above the lowermost leaf having upon their under surfaces elongated shallow channels arranged in stepped relation and overlapping, the channels or grooves of the leaves between the upper and lower leaves having openings of communication through said intermediate leaves, the upper leaf having inlet openings communicating with the grooves or channels of the upper leaf, the lower leaf having outlet openings communicating with the channels or grooves of the adjacent super-imposed leaf, whereby open ended channels from and through the upper leaf down to and through the lower leaf are afforded for the lubricant.

2. A spring comprising a series of superimposed leaves, securing means to hold the leaves together, the upper leaf having apertures, one upon each side of the securing means, the under surface of the upper leaf having channels extending from the apertures of the upper leaf, the lower leaf adjacent its outer end being provided with outlet apertures, the leaves intermediate the upper and lower leaves having apertures positioned in spaced relation, and having upon their under surfaces narrow elongated channels or grooves communicatively connecting their apertures to the apertures of the lower leaf and also communicatively connecting with the elongated grooves of the under surface of the upper leaf, whereby open ended lubricant receiving ducts are constructed through the spring on opposite sides of and extending from the securing means to the outer ends of the spring.

3. A spring comprising a series of superimposed leaves, means to secure the leaves together, the under faces of the leaves above the lowermost leaf having elongated narrow channels arranged in stepped relation and overlapping, the uppermost leaf having inlet openings for the oil communicating channels of the under face of the uppermost leaf, said leaves between the uppermost and lowermost leaves having apertures adajcent the upper ends of said channels, each communicatively connecting the upper end of one channel with the lower end of an adjacent channel, said apertures being offset from the upper ends of said channels, whereby when the spring is inverted, oil pockets are formed, the lowermost leaf having outlet openings communicatively connecting with the channels of the adjacent leaf, thereby permitting the escape of a cleaning fluid which may be allowed to enter the channels from the uppermost leaf.

In testimony whereof we hereunto affix our signatures.

JOHN MACKIE.
JOHN J. COTTRELL.